United States Patent

Stone

[15] 3,650,022
[45] Mar. 21, 1972

[54] METHOD OF ASSEMBLING THE ROTOR PAD SHAFT OF A DYNAMOELECTRIC MACHINE

[72] Inventor: Thomas W. Stone, Owosso, Mich.

[73] Assignee: The Singer Company, New York, N.Y.

[22] Filed: Dec. 12, 1969

[21] Appl. No.: 884,499

[52] U.S. Cl. .................................29/598, 29/609, 310/42, 310/216, 310/217
[51] Int. Cl. .................................H02k 15/02, H02k 15/10
[58] Field of Search ...............29/598, 596, 609, 597; 310/42, 310/261, 216, 217

[56] References Cited

UNITED STATES PATENTS

| | | |
|---|---|---|
| 1,762,017 | 6/1930 | Grenzer..................................29/598 |
| 1,158,463 | 11/1915 | Eaton ....................................29/598 |
| 2,421,115 | 5/1947 | Carlson..................................29/598 |
| 1,305,604 | 6/1919 | Holy......................................310/216 |
| 3,202,851 | 8/1965 | Zimmerle et al..................310/217 X |

*Primary Examiner*—John F. Campbell
*Assistant Examiner*—Carl E. Hall
*Attorney*—John W. Michael, Gerrit D. Foster, Bayard H. Michael, Paul R. Puerner, Joseph A. Gemignani, Andrew O. Riteris, Daniel Van Dyke and Spencer B. Michael

[57] ABSTRACT

A laminated rotor core is fastened to a shaft by applying a series of impact blows to an annular area surrounding the core opening into which the rotor shaft extends. This indents the laminations at the annular area and the lamination material within the annular area, i.e., between the annular area and the core opening, expands radially inward to grip the shaft.

19 Claims, 6 Drawing Figures

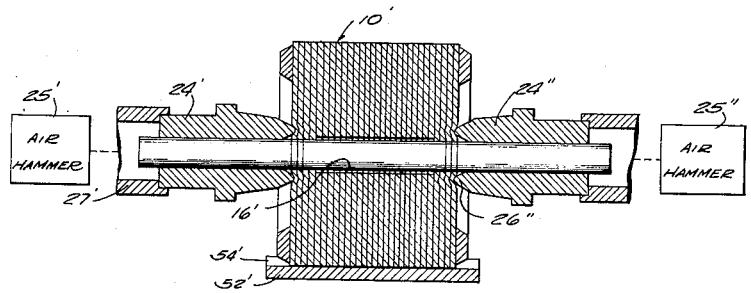

METHOD OF ASSEMBLING THE ROTOR PAD SHAFT OF A DYNAMOELECTRIC MACHINE

This invention relates to dynamoelectric machines and, more particularly, to the core-shaft assemblies thereof.

A long standing problem in the dynamoelectric machinery industry has been to provide a reliable and effective connection between the rotor core and shaft of the machine. That is, a connection which resists relative movement between shaft and core and/or shaft pull-out, which does not introduce eccentricity into the assembly, and which facilitates the overall assembly procedure. The matter of introduction of eccentricity into the assembly becomes particularly critical when processing pre-turned rotor cores, i.e., cores the outer cylindrical surface of which is turned prior to attachment to the shaft. Typical of the fastening techniques which have been used are shrink fit processes, knurled connections, and adhesive connections.

The shrink fit process requires very close tolerances on the shaft and the core opening for receiving the shaft and, moreover, requires extreme care in carrying out the actual assembly procedures. Typically, in this process the rotor core is heated, e.g., to approximately 800° F., to enlarge the central rotor opening. The core being laminated, there is no assurance the central opening will remain straight. After insertion of the shaft and subsequent cooling, the shaft may be bent. This will require straightening of the shaft to produce an acceptable assembly, if in fact the shaft can be straightened otherwise the assembly is rejected. In addition to shaft bending, some eccentricity may result and require a turning operation on the rotor. Thus, the shrink fit process can add operations to the basic assembly procedure.

In a knurled connection, the shaft is knurled and forced into the core opening. As in the shrink fit process, this results in a tight fit with positive holding action but the shaft is stressed and may bend. Moreover, in this type of connecting procedure the concentricity of the outer rotor surface and shaft is very apt to be adversely affected.

The adhesive connection avoids the problem of stressing and bending the shaft during fastening but it has other undesirable limitations. One is its holding power. The connection may hold well during ideal operation but will not stand up under less than ideal operating conditions which may be encountered and will stress the connection between the shaft and rotor, such as a locked rotor condition. Also, exposure to heat after the connection has been made, as in a curing process, may result in the shaft shifting in the core opening and concentricity being destroyed.

Accordingly, prior shaft fastening processes have not been completely satisfactory but have generally been somewhat deficient for one reason or another.

This invention is concerned with these problems and has among its general objects to provide an effective and reliable connection between a rotor core and shaft, to facilitate connection of core and shaft, and to provide an overall improved core and shaft assembly.

For the achievement of these and other objects, this invention proposes an arrangement wherein the rotor core is deformed in the area of the shaft receiving opening and around the shaft. The rotor is deformed such that it will have been expanded toward the shaft. This deformation of the core and expansion thereof toward the shaft positively grips the shaft, holds it against movement relative to the core or pull-out, and assures concentricity between the outer core surface and the shaft. Preferably, the deformation is produced by the application of a series of impact blows to the rotor core in the area of the core opening.

DESCRIPTION OF DRAWINGS

FIG. 1 is an axial section through a rotor core and shaft assembly for a dynamoelectric machine and fastened in accordance with this invention;

FIG. 2 is a section view of the core and shaft during the fastening procedure and schematically illustrating mechanism for accomplishing the connection;

FIG. 3 is an enlarged view of area A in FIG. 1;

FIG. 4 is an enlarged view of an end of the core and shaft assembly illustrating the annular deformed area of the core;

FIG. 5 is a plan view of an alternative form of core lamination; and

FIG. 6 is a view of alternative mechanism for accomplishing the connection.

DESCRIPTION OF PREFERRED EMBODIMENT

The invention will be described in connection with the rotor assembly of an electric motor but it will be appreciated that the invention may have wider application to dynamoelectric machines in general. With reference to FIG. 1, a rotor assembly is illustrated as including a core 10 connected to a shaft 12.

The rotor core illustrated is made up of a number of steel laminations 14. In a conventional manner the laminations are each provided with a central opening 17 and are aligned axially to define a generally cylindrical laminated core with a central opening 16 extending axially therethrough. End rings 18 and 20 are provided on the opposite axial ends of the core and provide the common conductor ring for the conductor bars (not shown) which normally extend through the core between the opposite axial ends. The manner of providing the conductor bars in the rotor core and end rings 18 and 20 forms no part of this invention and can be made in any conventional manner. For example, the conductor bars and end rings can be die cast in place on the rotor core which also serves to hold the laminations in the desired stacked relationship.

With the core constructed to this point, it is common to turn the outer cylindrical surface 22 thereof so that surface 22 is centered on the axis of opening 16.

The rotor assembly is then completed by connecting shaft 12 in opening 16. In connecting the shaft to the core, the shaft should not be bent in order that the rotor assembly will rotate true about the axis defined by the shaft. For example, in the case of a pre-turned core, i.e., where surface 22 is turned prior to assembly of the shaft, the shaft should be connected in the opening in precise concentric relationship with the cylindrical outer surface 22 to achieve true rotation of the outer cylindrical surface 22 on the shaft axis. Also, the connection must be such that the shaft will hold the prescribed relationship and will not rotate in or pullout from opening 16.

To provide this connection between the rotor core and shaft, this invention proposes to deform the core in the area of the shaft receiving opening 16 and around the shaft, to cause the core in the area of opening 16 to expand inwardly and grip the shaft. More specifically, the core 10 is engaged at one end by a tool 24, the tool engaging the core at areas around the opening 16. A force is then applied to the rotor core through tool 24 causing the laminations to expand radially inward in the area of opening 16 to grip the shaft.

More specifically and as illustrated in the drawings, tool 24 has a generally annular shaped end 26 which also has a chisel shape in axial cross section. The annular end 26 engages the left end, as viewed in FIG. 2, of rotor core 10. The opposite or right end of the rotor core can be supported against a fixed post 28 which can have an end 30 of the same configuration as end 26 of tool 24. Post 28 is rigidly held in fixture 32. The fixture includes a ring 34 engaging the post and seated against a shoulder 36 provided in plate 38. A support post 40 also engages the opposite axially end 42 of post 28 to cooperate in holding the post against axial movement in the fixture relative to core 10.

It will be noted that both tool 24 and post 28 are provided with circular bores 44 and 46. As will be discussed more completely hereinafter, these bores accommodate shaft 12 and position the shaft concentrically with respect to annular tool end 26 and outer core surface 22. With the elements arranged as illustrated in FIG. 2, the deforming force is applied through tool 24, directly to the outer lamination at the left end of core 10. As is perhaps best visible in FIG. 3, end lamination 14a in the area which is engaged by tool end 26 is indented and reduced in thickness. The lamination metal radially inside of that annular area expands radially inward toward shaft 12. Preferably, this reduction in thickness and radial inward expansion is carried through a number of laminations, e.g., approximately the first three laminations 14a, 14b and 14c.

The radial inward expansion of the laminations can be enhanced by the particular configuration of tool end 26. More particularly, it will be noted that the tool end is generally conical or chisel-shaped in axial cross-section having a small radius on end 26 and an inner surface 26a which slopes from the outer end 26 radially and axially inward with respect to the shaft axis and the tool end thus providing a generally wedged shaped area 48 between the tool and the shaft. With this arrangement, as the thickness of the laminations 14a, 14b and 14c is reduced immediately ahead of tool end 26, the metal tends to expand radially inwardly toward shaft 12 and surface 26a assists in guiding that radial expansion inward.

Preferably, the force exerted through the tool 24 to deform the laminations as described above is provided in the form of a series of impact blows by an impact device such as an air hammer 25 shown schematically in FIG. 2 and connected to tool 24 by tube 27. The air hammer oscillates tool 24 axially in providing the impact blows. The use of a series of impact blows is preferred in that it effectively deforms the laminations but with minimum if any stress on shaft 12 thereby avoiding any possible bending of the shaft during the fastening process. It has been observed that by using an air hammer and striking the rotor core through the tool 24, the indentation of the laminations penetrates through a number of the end laminations and, moreover, the inward radial expansion occurs with sufficient force to indent the shaft a shown in FIG. 3 at areas 50. The indentations add to the frictional holding force and it will be appreciated that the size of the indentations has been exaggerated in the drawing. The shaft has been found to be positively held in the core and such that any attempts to press the shaft from the core will only score the shaft and actually improve the holding force. Although the indentation of the shaft increases the holding force, frictional engagement without indenting force has also been found to be sufficient in some applications.

After the fastening connection is made at one axial end as just described, the rotor can be turned end for end in the arrangement illustrated in FIG. 2 and the process repeated to secure the opposite end of the core to the shaft.

In the typical assembly procedure, core 10 is located with respect to tool end 26 by fixture 52. The fixture includes an accurate upper surface 54 conforming to the circumference of the core and locates opening 16 concentrically relative to tool end 26 and post end 30. When so located, the core is clamped between tool 26 and post 28 with end 26 engaging the core approximately one thirty-seconds inch from the opening. At this point it should be noted that the sizes and spacing have been exaggerated in the drawings for illustrative purposes. Shaft 12 is inserted into bores 44 and 46 and the bores being concentric with their respective ends 26 and 30, the shaft is concentric with the tool end 26, opening 16 and outer surface 22. The air hammer is now activated. Approximately 90 pounds of air pressure is maintained on the hammer and the core is struck at a rate of approximately 18,000 to 24,000 blows per minute. This causes the indentations to penetrate for a distance of three to four laminations of the rotor core. It should also be noted that with this arrangement shaft 12 can actually provide a measure of support and guiding for tool 24 as it oscillates.

An initial clearance is usually provided between the shaft the core opening wall, e.g., on the order of 0.001 inch around the shaft. It has been observed that the 0.001 inch clearance is precisely maintained during this fastening process and is present in the central section of the core after the fastening process is completed. More particularly and with reference to FIGS. 1 and 3, after fastening of the core to the shaft the clearance, in this instance 0.001 inch, uniformly occurs circumferentially around shaft 12 axially between the areas gripped by the end laminations of the core. It is believed that this results from the fact that with the impact blows being provided through an annular area 56 which is concentric with opening 16, the laminations expand uniformly radially inward to uniformly grip shaft 12 and keep it precisely centered in opening 16. With this arrangement, and because of this clearance, any inaccuracies which may be present in the shaft surface do not have any effect on the rotor core shaft assembly. Where a pre-turned rotor core is being used, this method of assembly assures a precise concentric relationship between the shaft and the outer surface of the rotor.

Also, with the use of the series of impact blows, the actual pressure on the core is relatively low and hence does not result in any distortion or damage of the rotor assembly. Although the deformation of the laminations inwardly to grip the shaft occurs so uniformly that generally the shaft will not be stressed, a further advantage of the low pressures which are exerted on the core is such that should an abnormal operation occur and any stresses be applied to the shaft they will be so minimal as to be virtually ineffectual.

In the discussion relating to FIGS. 1–4 it was assumed that opening 16 was formed by a number of aligned circular holes in each of the laminations. A polygon shaped opening 58 as illustrated in FIG. 5 can also be used and may in fact enhance the gripping action. With the polygon shape, for example, the octagonal shape of FIG. 5, as the opening expands radially inward by application of the impact force to annular area 56', the straight sides of the octagonal hole grip and penetrate the shaft. With either the circular hole or the octagonal hole, the connection between the laminations and the shaft exhibits the characteristics of a cold weld.

Also, in connection with some cores it is possible to bring the core to the shaft connection step after the core has been heat treated so that it is relatively soft. This will facilitate the deformation and inward expansion of the lamination. This is believed to augment the basic gripping action between the core laminations and the shaft.

FIG. 6 illustrates another arrangement which may be used to fasten the shaft to the core. In this arrangement two air hammers 25' and 25'' are used with two identical tools 24' and 24'' which have the same construction and arrangement as tool 24 discussed in connection with FIGS. 1–4. Again in this arrangement the core 10' is located by fixture 52' between tools 24' and 24'' and core 10' is clamped between the tools with the opening 16' thereof concentric with ends 26' and 26''. Both air hammers are operated simultaneously and both core ends are deformed simultaneously. The details of spacing, pressure, and air hammer oscillations may be as discussed above.

Although the present invention has been illustrated and described in connection with particular embodiments thereof, it will be apparent to those skilled in the art that various changes and modifications may be made therein without departing from the spirit of the invention or from the scope of the appended claims.

I claim:

1. The method of fastening a rotor core of a dynamoelectric machine to a shaft comprising providing a rotor core having an axial shaft receiving opening therein, positioning a shaft in said opening with an end projecting through an end of said opening, and deforming an area of said rotor core spaced radially outward from said opening and thereby deforming said rotor core radially inward from said deformed area toward said shaft so that the inward deformation of said rotor core grips said shaft to hold said shaft in said opening.

2. The method of claim 1 wherein said rotor core is deformed inwardly sufficient to indent said shaft.

3. The method of claim 1 wherein said rotor core is deformed in an annular area concentric with said opening and said inward deformation grips circumferentially around said shaft.

4. The method of claim 1 wherein said rotor core comprises a plurality of axially arranged laminations.

5. The method of claim 1 wherein said rotor core is deformed by the application of a series of impact blows to said core.

6. The method of claim 5 wherein said rotor core comprises a plurality of axially arranged laminations.

7. The method of fastening a rotor core of a dynamoelectric machine to a shaft comprising providing a laminated rotor core having a central axial opening extending therethrough, positioning a shaft in said opening with the ends thereof projecting through the opposite axial ends of said rotor core, and applying a deforming force to said opposite axial ends of said rotor core in an area of rotor core spaced radially outward from said opening and thereby deforming the axially outermost rotor core laminations radially inward from said deformed area toward said shaft so that said deformed rotor core laminations grip said shaft at both axial ends of said core to hold said shaft in said opening.

8. The method of claim 7 wherein said rotor is deformed by a series of impact blows to said core.

9. The method of claim 8 wherein said rotor core is deformed in an annular area concentric with said opening and said inward deformation grips circumferentially around said shaft.

10. The method of claim 9 wherein said rotor is deformed by a tool having an annular end engaging one axial end of said rotor core in said annular area and said tool end having an inner surface which slopes, with respect to the axis of said opening and said tool end, axially and radially inward, including supporting the opposite axial end of said rotor core, and oscillating said tool in an axial direction to provide said impact blows.

11. The method of claim 10 wherein, prior to providing said impact blows, said core is located relative to said tool end concentric with said opening, said shaft is positioned within said opening and extending into said tool end and concentric with said opening and tool end, and said concentric arrangements are maintained during application of said impact blows.

12. The method of claim 10 wherein said rotor core is deformed axially inward to a depth of approximately 3 to 4 laminations at both axial ends of said rotor.

13. The method of claim 9 wherein said rotor core is deformed inwardly sufficient to indent said shaft.

14. The method of claim 9 wherein said rotor opening has a polygon shape in radial cross section providing a plurality of flat surfaces engaging said shaft.

15. The method of fastening a rotor core to a shaft comprising providing a laminated rotor core having an axial shaft receiving opening therein, positioning a shaft in said shaft opening with an end projecting through the end of said opening, engaging the outermost lamination of said rotor core with a tool having a generally annular, generally chisel-shaped in cross-section tool end in engagement with said outermost lamination, said engagement occuring in an area spaced radially outward from and around said opening, and imparting a series of impact blows to said outermost laminations and thereby deforming, at the area of engagement by said tool end, said outermost lamination and those adjacent to it by indenting said laminations axially inward and expanding said laminations radially inward from said area of engagement to grip said shaft.

16. The method of claim 15 wherein both axial ends of said core are deformed in accordance with the method of claim 15.

17. The method of claim 15 wherein said laminations are interconnected and the outer surface of said core is turned concentric with said opening prior to fastening of said shaft in said opening, and said annular tool end is arranged concentrically with said opening in imparting said impact forces.

18. The method of claim 17 wherein said tool includes a bore concentric with said annular tool end and said shaft is positioned in said bore prior to imparting said impact blows and said bore locates said shaft concentrically with said outer core surface.

19. The method of claim 17 wherein said opening extends axially through said core, wherein the end of said bore opposite to the end engaged by said tool is supported by a hollow member having an internal bore and aligned and concentric with said tool bore, and wherein said shaft, prior to imparting said impact blows, is extended through said core and into said bores for support thereby.

* * * * *